United States Patent
Brito Da Costa et al.

(10) Patent No.: US 12,290,968 B2
(45) Date of Patent: May 6, 2025

(54) METHOD FOR THE MANUFACTURE OF POST-DEFORMABLE HIGH-PRESSURE COMPOSITE AND PRODUCT OBTAINED THEREFROM

(71) Applicant: SURFORMA, S.A., Maia (PT)

(72) Inventors: Claudia Brito Da Costa, Maia (PT); Raul Manuel Esteves De Sousa Fangueiro, Braga (PT); Fernando Eduardo Macedo Da Cunha, Braga (PT); Carlos Miguel Costa Mota, Amares (PT); Jorge Filipe Soares Teixeira, Sao Mamede Infesta (PT)

(73) Assignee: SURFORMA, S.A., Maia (PT)

( * ) Notice: Subject to any disclaimer, the term of this patent is extended or adjusted under 35 U.S.C. 154(b) by 120 days.

(21) Appl. No.: 17/792,425

(22) PCT Filed: Dec. 30, 2020

(86) PCT No.: PCT/IB2020/062533
§ 371 (c)(1),
(2) Date: Jul. 13, 2022

(87) PCT Pub. No.: WO2021/148872
PCT Pub. Date: Jul. 9, 2021

(65) Prior Publication Data
US 2022/0388205 A1      Dec. 8, 2022

(30) Foreign Application Priority Data
Jan. 21, 2020   (PT) .................................... 116068

(51) Int. Cl.
*B29C 70/46* (2006.01)
*B29C 43/14* (2006.01)
(Continued)

(52) U.S. Cl.
CPC .......... *B29C 43/203* (2013.01); *B29C 43/146* (2013.01); *B32B 5/02* (2013.01);
(Continued)

(58) Field of Classification Search
CPC ............ B29C 43/203; B29C 2043/186; B29C 37/0025; B29C 2037/0042; B29C 70/026; B29C 70/465; B29C 43/206; B29C 70/46
See application file for complete search history.

(56) References Cited

U.S. PATENT DOCUMENTS

| 3,373,070 A | 3/1968 | Fuerst | |
|---|---|---|---|
| 2007/0070164 A1* | 3/2007 | Eleazer | D03D 15/283 347/105 |
| 2019/0153674 A1* | 5/2019 | Behabtu | D21H 19/62 |

FOREIGN PATENT DOCUMENTS

| EP | 1268200 A1 | 1/2003 |
|---|---|---|
| WO | 2012009528 A1 | 1/2012 |

OTHER PUBLICATIONS

Graupner, N., et al., Copy paper as a source of reinforcement for biodegradable composites—Influence of fibre loading, processing method and layer arrangement—An overview, Composites Part A, vol. 120 (2019), pp. 161-171. (Year: 2019).*

(Continued)

*Primary Examiner* — Matthew J Daniels
(74) *Attorney, Agent, or Firm* — Rivka Friedman

(57) ABSTRACT

The present invention falls within the scope of thermo-laminated and compact high-pressure composites, namely it relates to a method for the manufacture of a post-deformable high-pressure composite, which can be used in the automotive, aircraft, railway and naval industries, as well as in the architecture and design sector, both in indoor and outdoor environments, comprising the steps of formation of a composite (1) by the arrangement of at least two layers of material, including a layer of Kraft paper sheets (3) coated (Continued)

with thermoplastic resin and a layer of decorative coating; the composite formed in a flat shape, when subjected to a certain temperature and pressure in a mould (4), changes in its geometry according to the shape of that mould (4). It is also an object of this invention the product obtained with the aforementioned manufacturing method.

15 Claims, 1 Drawing Sheet

(51) Int. Cl.
    *B29C 43/20*     (2006.01)
    *B32B 5/02*     (2006.01)
    *B32B 29/00*     (2006.01)
    *B32B 29/02*     (2006.01)
    *B32B 29/06*     (2006.01)
    *B29K 101/12*     (2006.01)
    *B29K 711/12*     (2006.01)

(52) U.S. Cl.
    CPC ............ *B32B 29/005* (2013.01); *B32B 29/02* (2013.01); *B32B 29/06* (2013.01); *B29K 2101/12* (2013.01); *B29K 2711/123* (2013.01); *B32B 2255/12* (2013.01); *B32B 2255/26* (2013.01); *B32B 2262/101* (2013.01); *B32B 2262/106* (2013.01); *B32B 2307/54* (2013.01); *B32B 2307/546* (2013.01); *B32B 2307/558* (2013.01); *B32B 2307/718* (2013.01); *B32B 2307/72* (2013.01)

(56) References Cited

OTHER PUBLICATIONS

Zigon, J., M. Petric, S. Dahle, Dielectric barrier discharge (DBD) plasma pretreatment of lignocellulosic materials in air at atmospheric pressure for their improved wettability: a literature review, Holzforschung, vol. 72, No. 11 (2018), pp. 979-991. (Year: 2018).*

John, M.J, B. Francis, K.T. Varughese, S. Thomas, Effect of chemical modification on properties of hybrid fiber biocomposites, Composites: Part A, vol. 39 (2008), pp. 352-363. (Year: 2008).*

\* cited by examiner

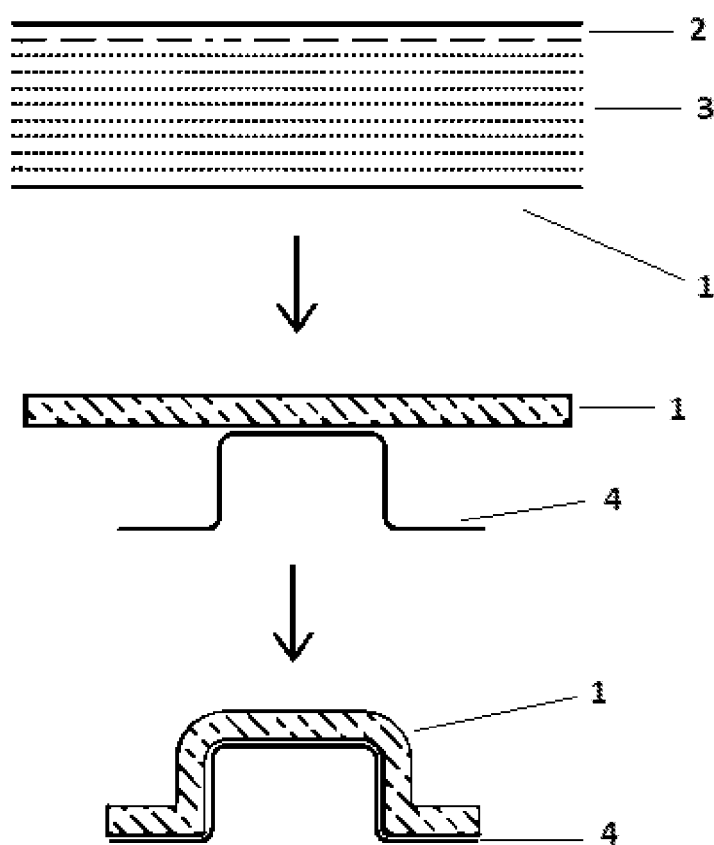

METHOD FOR THE MANUFACTURE OF POST-DEFORMABLE HIGH-PRESSURE COMPOSITE AND PRODUCT OBTAINED THEREFROM

SCOPE AND BACKGROUND OF THE INVENTION

The present invention falls within the scope of thermo-laminated and compact high-pressure composites, namely it relates to a method for manufacturing a post-deformable high-pressure composite (1) and the product thereby obtained, which can be used in the automotive, aircraft, railway and naval industries, as well as in the architecture and design sector, both in indoor and outdoor environments.

The deformable composite (1), object of this invention, is mouldable as a semi-finished product in a flat shape, i.e., when subjected to a certain temperature and pressure, it is susceptible of being moulded, changing its shape according to a design defined by the user, keeping the physical, chemical and mechanical characteristics of the semi-finished product even after deformation.

It is a recyclable and reusable product with a density lower than that of traditional non-deformable composites (1). It is thus a product that combines physical and chemical resistance with deformation capacity, decorative function, and low weight compared to traditional compacts.

The traditional composites, known in the state of the art, are constructive solutions with a good performance from the point of view of mechanical resistance, since they represent alternatives to wood, ceramic tiles and stone, however they still represent a conventional solution from the aesthetic point of view, in as much as the surface aspect of this composite (1) is generally flat and static, supplied in slabs with a smooth finish, with no possibility of changing its shape.

The present invention finds a closer background in high-pressure composites, comprised of several layers of fibrous cellulosic material of the Kraft paper type, impregnated with thermosetting resins, usually melamine-formaldehyde, phenol-formaldehyde or urea-formaldehyde, joined by means of a process based upon temperature and high pressure.

In general, a high-pressure laminated or compact composite is comprised of two or three layers: 1) Kraft paper, the innermost layer of the laminate, which consists of multiple sheets of Kraft paper impregnated with thermosetting resins such as phenolic resin or a mixture of phenolic resins and urea, which confer mechanical resistance to the product; 2) decorative finish, a layer adjacent to the previous one and which after application is exposed to the environment, usually consisting of a thin and decorative paper printed in solid colour or with a pattern, also consisting of wood or stone, being impregnated with thermosetting resin, for example melamine or acrylic resin; 3) an optional layer, arranged between the first and the second layer, the reinforcement of the decorative finishing, which consists of a thin and transparent paper, infused with a thermosetting resin, such as a melamine resin, which gives the composite surface resistance to abrasion, durability, resistance to stains and scratches, and moisture to the product.

In the present invention, the thermosetting resins used in traditional composites have been partially replaced by thermoplastic resins, namely the resins used to impregnate the Kraft paper layer (3) have been replaced by thermoplastic resins which, when submitted to a certain temperature, become flexible and mouldable, making it possible to mould the composite into various shapes and reliefs. For the implementation of this invention using a thermoplastic resin it was essential to study the compatibility between Kraft paper and thermoplastic resin.

Thus, this invention combines the physical-mechanical and chemical characteristics of a conventional composite with the characteristics of flexibility and mouldability, providing a coating with a finish of various shapes both in-plane and in-depth, i.e. it is possible to obtain a composite with projections of different dimensions along its surface.

The mouldability characteristics of the composite object of this invention make it a highly versatile composite (1) in as much as it can be applied as a finished product in the aircraft and automotive industries, namely in the interior coating of planes and cars, in architectural and construction solutions, both in indoor and outdoor environments, furniture and design.

SUMMARY OF THE INVENTION

The present invention relates to the method for manufacturing a post-deformable high-pressure composite (1) and the product resulting from its manufacture, whose innovation lies in the ability to change its geometry by inducing a specific temperature and pressure after it has been manufactured in flat shape.

So, the method intended for the manufacture of a post-deformable high-pressure composite (1) comprises the following essential steps:
a) formation of a composite (1) by arranging at least two layers of material, among which:
  i. a plurality of Kraft paper sheets (3) coated with at least one type of thermoplastic resin, forming a laminate with two opposite flat surfaces; and
  ii. a decorative coating (2) arranged on at least one of the flat surfaces of the laminate, the said decorative coating (2) being impregnated with at least one thermosetting resin or at least one thermoplastic resin;
b) hot compression moulding of the composite (1) formed in step a) by means of compression moulding at a temperature between 120° C. and 200° C. and at a pressure between 50 and 120 bar for 5 to 25 minutes;
c) the composite (1) formed in step b) remains in the compression moulding means until the latter cool to a temperature ranging from 17 to 22° C. and at a pressure between 50 and 120 bar.

In a preferred embodiment of the invention, the composite (1) formed in step a) is subjected to a pre-moulding by placing the laminate on the compression moulding means at a pressure between 10 and 40 bar until a temperature of from 120° C. to 200° C. is reached.

In another preferred embodiment of the invention, the moulding means are a plate press.

This pre-moulding step allows the resin to gradually reach a temperature between 120° C. and 200° C., as well as a gradual compaction of the laminate. The pressure exerted by the press in this pre-moulding step is lower than in the following moulding step, in order to ensure that the resin reaches the desired temperature without a displacement occurring between the sheets layer. A lower mechanical strength in the press enables a more effective heat transfer to the resin.

In another embodiment of the invention, and after step (i), synthetic fibres are additionally laid on at least one side of the laminate in a proportion between 5 and 20% of the total weight of the laminate. These synthetic fibres will contribute to greater mechanical strength of the composite (1), cohesion and fire resistance.

In this process, the thermoplastic resin that impregnates the Kraft paper sheets (3) is brought to the melt, reducing its viscosity, being able to adhere to the adjacent layer, the decorative thin coating (2) penetrating the pores of the Kraft paper sheets (3) and of the synthetic fibres, with the layers adhering to each other. During the cooling phase, the polymeric material solidifies inside the intra- and intermolecular pores of Kraft paper (3) and inorganic fibres, giving rise to a cohesive compact.

It should be noted that the decorative coating (2), which is the outermost layer of the composite (1), can be impregnated with a thermoplastic resin or a thermosetting resin. The impregnation of the decorative coating (2), even with a more rigid resin such as the thermosetting resin, does not impair the post-deformation capacity of the final solution, and keeps the surface resistance of a traditional laminate.

In one embodiment of this invention, the decorative coating (2) is decorative paper.

In another embodiment of the invention, the decorative coating (2) is a woven-type coating.

In this hot compression moulding process, the processing temperatures shall be between 120° C. and 200° C. so as not to cause degradation of the Kraft paper (3) and decorative thin coating (2). The pressure applied by the compression moulding means should range from 50 to 120 bar, in order to ensure that all empty spaces are filled by the thermoplastic resin, reducing the thickness of the laminate.

Depending on the application of the composite (1), its thickness may vary, so the selection of the grammage of the Kraft paper sheets (3) is essential for determining the thicknesses selected for the manufacture. Thus, the chosen Kraft paper (3) must be of the type of impregnation paper and may have a grammage between 150 and 250 g/m².

It should be explained that Kraft (3) impregnation papers are prepared for impregnation with thermosetting resins. These thermosetting resins have a lower viscosity than thermoplastic resins and are generally formulated with an aqueous base that is naturally compatible with paper and therefore advantageous for paper impregnation.

These papers can therefore undergo an additional pre-treatment in order to promote the impregnation of the resin into their substrate. Kraft paper sheets (3) undergo a surface treatment with cold plasma produced by dielectric-barrier discharge at atmospheric pressure, which increases the surface energy and the roughness of the paper surface, so as to consequently increase its wettability, i.e. the resin absorption.

Furthermore, a pre-treatment with alkaline solutions with a concentration between 1 and 3% of sodium hydroxide promotes the degradation of some hydrophobic components of Kraft paper (3) such as lignin, promoting the wettability of the paper and consequently enabling a better penetration of the resin in the paper, thus ensuring the mouldability of the composite (1) to be formed as well as its mechanical resistance.

It is now important to explain how the thermoplastic resin is selected. The selection of the type of resin is essential for implementing the invention as it must be compatible with Kraft paper sheets (3), so characteristics such as fluidity index, processing temperature and density determine its degree of compatibility with the paper.

Kraft paper sheets (3) are composed of cellulosic fibres that start to degrade at 200° C. It is therefore essential to select a thermoplastic resin with a processing temperature below the degradation temperature of cellulosic fibres.

The selected thermoplastic resin has a fluidity index of from 4 to 8, preferably 6. It shall also have a processing temperature ranging between 120° C. and 200° C. and a density between 0.7 and 1.3 g/m3. The lower the density of the resin, the lower will be the density of the composite (1).

The Kraft paper sheets (3) that form the laminate in step a) are coated with thermoplastic resin in a proportion of 25-35% resin to 65-75% Kraft paper (3).

The composite (1), after its manufacture or once it has reached dimensional stability after step c), can be thermoformed to create the shape through a mould (4) at a temperature between 100 and 130° C. and at a pressure between 2 and 40 bar; typically, this can be carried out by the vacuum thermoforming method.

DESCRIPTION OF THE FIGURES

FIG. 1—schematic general representation of the process in the thermoforming step of the post-deformable composite (1) through a mould (4), the composite (1) comprising a decorative coating (2), a plurality of Kraft paper sheets (3) coated with thermoplastic resin.

DETAILED DESCRIPTION OF THE INVENTION

The general configurations of this invention are described in the Summary of the Invention. Those configurations are detailed below, according to other advantageous and/or alternative embodiments of the present invention.

Synthetic fibres can be selected from glass, basalt and/or carbon fibres, with a surface unit of about 150 g/m².

Kraft paper sheets (3) have a porosity of less than 14 seconds in Gurley porosity and a maximum tensile strain of more than 15 N/(g·m). The porosity of the selected Kraft paper (3) is high comparatively to other Kraft papers (3) in order to allow the thermoplastic resin to penetrate in the paper pores and integrate therein. On the other hand, it is also a paper with high mechanical resistance so as to bear the resin load without tearing and, thus, guaranteeing that the composite (1) is given an overall mechanical resistance.

Thermoplastic resins can be selected among polypropylene, polyamide and polyethylene-type resins. Depending on the application of the final product, the preferred resins are polyethylene and polyamide. The polyethylene resin gives a higher resistance to impact and a lower density to the composite (1), i.e. lighter composite(s) (1). On the other hand, polyamide resin provides greater bending strength and therefore a more robust composite (1).

In addition to these selection factors, the way in which the thermoplastic resin is supplied is also essential for the implementation of the invention as it influences the efficiency of impregnation. Thermoplastic resin is supplied in powder, film, paste or non-woven form. Thus, the way in which the Kraft sheets (3) are coated will depend on how the thermoplastic resin is supplied.

In a preferred embodiment of this invention, the thermoplastic resin is in the form of a film, the coating of the Kraft paper sheets (3) being made by intercalating Kraft paper sheets (3) with thermoplastic films. The manufacture of the composite (1) is made easier and faster with the resin supplied in film or non-woven forms, since the compression moulding process itself promotes the integration of the resin into the paper by causing it to penetrate the paper pores due to the pressure of the compression means and under the action of heat.

The thickness of the post-deformable composite (1) obtained may vary between 0.8 and 30 mm, depending on the grammage of the Kraft paper (3) and the number of Kraft paper (3) sheets used. It should be noted that post-deformable composites (1) with a thickness between 0.8 and mm are known as thin laminated composites, while composites (1) whose thickness is between 2 mm and 30 mm are referred to as compact composites.

The final product obtained from the process described above, i.e. the post-deformable high-pressure composite (1) has a resistance to impact higher than 5000000000 Pa, a bending strength higher than 5000 J/m2 and a density lower than 1.45 g/m$^3$.

Surface resistance (scratch, abrasion, water vapour, impact and chemicals) must comply with the standards which are applicable to the conventional high-pressure laminates and compacts.

Dimensional stability, stability in wet environments or outdoor environments, must comply with the standards applicable to the conventional high-pressure laminates and compacts.

The invention claimed is:

1. A method for the manufacture of a post-deformable high-pressure composite, characterized in that it comprises the following steps:
   a) formation of a composite (1) by the arrangement of at least two layers of material, among which:
      i. a plurality of Kraft paper sheets (3) coated with at least one type of thermoplastic resin, forming a laminate with two opposite flat surfaces; and
      ii. a decorative coating (2) arranged on at least one of the flat surfaces of the laminate, the said decorative coating (2) being impregnated with at least one thermosetting resin or at least one thermoplastic resin;
   b) hot compression moulding of the composite (1) formed in step a) by means of compression moulding at a temperature between 120° C. and 200° C. and at a pressure between 50 and 120 bar for 5 to 25 minutes;
   c) the composite (1) formed in step b) remains in the compression moulding means until the latter cool to a temperature ranging from 17 to 22° C. and at a pressure between 50 and 120 bar;
   wherein the Kraft paper sheets undergo a surface treatment with cold plasma produced by dielectric-barrier discharge at atmospheric pressure; and
   wherein after step (i), synthetic fibres are additionally laid on at least one side of the laminate in a proportion between 5 and 20% of the total weight of the laminate.

2. The manufacturing method according to claim 1, wherein the composite (1) formed in step a) is subjected to a pre-moulding by placing the laminate on the compression moulding means at a pressure between 10 and 40 bar until a temperature between 120° C. and 200° C. is reached.

3. The manufacturing method according to claim 2, wherein the moulding means are a plate press.

4. A method for the manufacture of a post-deformable high-pressure composite, characterized in that it comprises the following steps:
   a) formation of a composite (1) by the arrangement of at least two layers of material, among which:
      i. a plurality of Kraft paper sheets (3) coated with at least one type of thermoplastic resin, forming a laminate with two opposite flat surfaces; and
      ii. a decorative coating (2) arranged on at least one of the flat surfaces of the laminate, the said decorative coating (2) being impregnated with at least one thermosetting resin or at least one thermoplastic resin;
   b) hot compression moulding of the composite (1) formed in step a) by means of compression moulding at a temperature between 120° C. and 200° C. and at a pressure between 50 and 120 bar for 5 to 25 minutes;
   the composite (1) formed in step b) remains in the compression moulding means until the latter cool to a temperature ranging from 17 to 22° C. and at a pressure between 50 and 120 bar;
   wherein after step (i), synthetic fibres are additionally laid on at least one side of the laminate in a proportion between 5 and 20% of the total weight of the laminate.

5. The manufacturing method according to claim 4, wherein the synthetic fibres are glass, basalt and/or carbon fibres with a surface unit of about 150 g/m$^2$.

6. The manufacturing method according to claim 1, wherein the Kraft paper sheets undergo a pre-treatment with alkaline solutions with a concentration between 1 and 3% of sodium hydroxide.

7. The manufacturing method according to claim 1, wherein the Kraft paper sheets have a grammage between 150 and 250 g/m$^2$, a porosity of less than 14 seconds in Gurley porosity.

8. The manufacturing method according to claim 1, wherein the thermoplastic resin has a fluidity index between 5 and 8, a processing temperature ranging from 120° C. to 200° C. and a density between 0.7 and 1.3 g/m$^3$.

9. The manufacturing method according to claim 8, wherein the Kraft paper sheets are coated with thermoplastic resin in a proportion of 25-35% resin to 65-75% Kraft paper.

10. The manufacturing method according to claim 9, wherein the thermoplastic resin is selected among polypropylene, polyamide and polyethylene resins.

11. The manufacturing method according to claim 1, wherein the thermoplastic resin is in the form of a film, the coating of the Kraft paper sheets (3) being made by intercalating Kraft paper sheets (3) with thermoplastic films.

12. The manufacturing method according to claim 1, wherein after step c), once the composite has cooled and stabilized, it can be thermoformed to create the shape through a mould (4) at a temperature between 100 and 130° C. and at a pressure between 2 and 40 bar.

13. The manufacturing method according to claim 1, wherein the decorative coating is a decorative paper.

14. The manufacturing method according to claim 1, wherein the decorative coating is a woven-type coating.

15. The manufacturing method according to claim 1, wherein the thermoplastic resin has a fluidity index of 6, a processing temperature ranging from 120° C. to 200° C. and a density between 0.7 and 1.3 g/m$^3$.

* * * * *